United States Patent
Riley et al.

(10) Patent No.: US 11,170,255 B2
(45) Date of Patent: Nov. 9, 2021

(54) TRAINING A MACHINE LEARNING MODEL WITH SYNTHETIC IMAGES

(71) Applicant: KLA-Tencor Corporation, Milpitas, CA (US)

(72) Inventors: Ian Riley, San Jose, CA (US); Li He, San Jose, CA (US); Sankar Venkataraman, Milpitas, CA (US); Michael Kowalski, Scotts Valley, CA (US); Arjun Hegde, Newark, CA (US)

(73) Assignee: KLA-Tencor Corp., Milpitas, CA (US)

( * ) Notice: Subject to any disclaimer, the term of this patent is extended or adjusted under 35 U.S.C. 154(b) by 314 days.

(21) Appl. No.: 16/357,360

(22) Filed: Mar. 19, 2019

(65) Prior Publication Data

US 2019/0294923 A1    Sep. 26, 2019

Related U.S. Application Data

(60) Provisional application No. 62/646,207, filed on Mar. 21, 2018.

(51) Int. Cl.
*G06K 9/00*    (2006.01)
*G06K 9/62*    (2006.01)
(Continued)

(52) U.S. Cl.
CPC ......... *G06K 9/6256* (2013.01); *G06F 3/0482* (2013.01); *G06K 9/6267* (2013.01);
(Continued)

(58) Field of Classification Search
None
See application file for complete search history.

(56) References Cited

U.S. PATENT DOCUMENTS 7,570,796 B2    8/2009    Zafar et al.
7,676,077 B2    3/2010    Kulkarni et al.
(Continued)

FOREIGN PATENT DOCUMENTS

WO    2005/001742    1/2005

OTHER PUBLICATIONS

International Search Report for PCT/US2019/023047 dated Jul. 4, 2019.
U.S. Appl. No. 16/364,140, filed Mar. 25, 2019.

*Primary Examiner* — Sean M Conner
(74) *Attorney, Agent, or Firm* — Ann Marie Mewherter

(57) ABSTRACT

Methods and systems for training a machine learning model using synthetic defect images are provided. One system includes one or more components executed by one or more computer subsystems. The one or more components include a graphical user interface (GUI) configured for displaying one or more images for a specimen and image editing tools to a user and for receiving input from the user that includes one or more alterations to at least one of the images using one or more of the image editing tools. The component(s) also include an image processing module configured for applying the alteration(s) to the at least one image thereby generating at least one modified image and storing the at least one modified image in a training set. The computer subsystem(s) are configured for training a machine learning model with the training set in which the at least one modified image is stored.

22 Claims, 7 Drawing Sheets

(51) Int. Cl.
  *G06N 20/00* (2019.01)
  *G06F 3/0482* (2013.01)
  *G06T 7/00* (2017.01)
  *G06N 3/08* (2006.01)

(52) U.S. Cl.
  CPC ............. *G06N 20/00* (2019.01); *G06T 7/001* (2013.01); *G06N 3/08* (2013.01); *G06T 2200/24* (2013.01); *G06T 2207/10061* (2013.01); *G06T 2207/20081* (2013.01); *G06T 2207/30148* (2013.01)

(56) References Cited

U.S. PATENT DOCUMENTS

| | | | |
|---|---|---|---|
| 7,761,182 B2 | 7/2010 | Gallarda et al. | |
| 8,126,255 B2 | 2/2012 | Bhaskar et al. | |
| 8,664,594 B1 | 4/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,222,895 B2 | 12/2015 | Duffy et al. | |
| 2002/0009220 A1 | 1/2002 | Tanaka | |
| 2012/0002860 A1 | 1/2012 | Sakai et al. | |
| 2013/0140457 A1* | 6/2013 | Minekawa | G06T 7/0004 250/307 |
| 2017/0140524 A1 | 5/2017 | Karsenti et al. | |
| 2017/0148226 A1 | 5/2017 | Zhang et al. | |
| 2017/0193400 A1 | 7/2017 | Bhaskar et al. | |
| 2017/0193680 A1 | 7/2017 | Zhang et al. | |
| 2017/0194126 A1 | 7/2017 | Bhaskar et al. | |
| 2017/0200260 A1 | 7/2017 | Bhaskar et al. | |
| 2017/0200264 A1 | 7/2017 | Park et al. | |
| 2017/0200265 A1 | 7/2017 | Bhaskar et al. | |
| 2017/0345140 A1 | 11/2017 | Zhang et al. | |
| 2017/0351952 A1 | 12/2017 | Zhang et al. | |
| 2018/0107928 A1 | 4/2018 | Zhang et al. | |
| 2018/0293721 A1 | 10/2018 | Gupta et al. | |
| 2018/0330511 A1 | 11/2018 | Ha et al. | |
| 2019/0005629 A1 | 1/2019 | Dandiana et al. | |
| 2019/0073568 A1 | 3/2019 | He et al. | |
| 2019/0197356 A1* | 6/2019 | Kurita | G06K 9/6254 |
| 2019/0287283 A1* | 9/2019 | Lin | G06T 5/20 |
| 2020/0226420 A1* | 7/2020 | Shaubi | G06N 3/08 |

* cited by examiner

TRAINING A MACHINE LEARNING MODEL WITH SYNTHETIC IMAGES

BACKGROUND OF THE INVENTION

1. Field of the Invention

The present invention generally relates to methods and systems configured for training a machine learning model using one or more synthetic images.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation.

Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc. Defects can generally be more accurately classified into defect types based on information determined by defect review compared to inspection.

Advances in deep learning have made deep learning an attractive framework for use in defect detection and classification. For classification, in training, a user may assign labels to defect images. During production (after training), with defect images as an input to the deep learning model, the deep learning model will output image classification and confidence associated with the image classification. For detection, a user may assign pixel level labels to defect images (multiple classes of defect images typically). The pixel level labels and defect images are used to train a defect detection deep learning model, which may be different than the deep learning model that is trained for defect classification. In other words, the detection deep learning model and the classification deep learning model may be mutually exclusive. Output from the detection deep learning model (blobs) and blob level labels may be used to train the classification deep learning model. During production (after training of the detection deep learning model), defect images are input to the detection deep learning model, which outputs blobs, and the classification deep learning model outputs classification per blob and associated confidence.

There are, however, a number of disadvantages to the currently used methods and systems described above. For example, currently classifiers are trained on only existing examples of defects. Such training has at least three significant drawbacks. First and foremost, it is impossible to train a detection/classification model without defect of interest (DOI) examples. Second, even if users collect a few DOI examples on which to train, the ability of the trained model to correctly capture and classify DOIs is completely dependent on the size, quality, and variance of this set of previously discovered examples. Because this data is hard to collect, training sets often contain too few examples to train good models. Even in the case where the training set contains many examples of a given defect, the examples may not cover the entire range of appearances that that particular defect may have and the resulting classifier will miss the unrepresented variants. Third, compiling a training set is non-trivial and prone to human error. Images of wafers or other specimens must be combed visually for defects and annotated with class labels. Since defects are often sparse, the number of images that may have to be manually scanned to find a single example defect usually renders such manual defect detection impractical.

Accordingly, it would be advantageous to develop systems and methods for training a machine learning model that do not have one or more of the disadvantages described above.

SUMMARY OF THE INVENTION

The following description of various embodiments is not to be construed in any way as limiting the subject matter of the appended claims.

One embodiment relates to a system configured to train a machine learning model. The system includes one or more computer subsystems and one or more components executed by the one or more computer subsystems. The one or more components include a graphical user interface (GUI) configured for displaying one or more images for a specimen and image editing tools to a user. The GUI is also configured for receiving input from the user, which includes one or more alterations to at least one of the one or more images using one or more of the image editing tools. The component(s) also include an image processing module configured for applying the one or more alterations to the at least one of the one or more images thereby generating at least one modified image and storing the at least one modified image in a training set. The component(s) further include a machine learning model configured for performing one or more functions for the specimen using images generated for the specimen by an imaging subsystem. The computer subsystem(s) are configured for training the machine learning model with the training set in which the at least one modified image is stored. The system may be further configured as described herein.

Another embodiment relates to a computer-implemented method for training a machine learning model. The method includes displaying one or more images for a specimen and image editing tools to a user with a GUI and receiving input from the user via the GUI. The input includes one or more alterations to at least one of the one or more images using one or more of the image editing tools. The method also includes applying the one or more alterations to the at least one of the one or more images thereby generating at least one modified image. In addition, the method includes storing the at least one modified image in a training set. The applying and storing are performed by an image processing module. The method further includes training a machine learning model with the training set in which the at least one modified image is stored. The machine learning model is configured for performing one or more functions for the specimen using images generated for the specimen by an imaging subsystem. The GUI, the image processing module, and the machine learning model are included in one or more components executed by one or more computer subsystems. The training is performed by the one or more computer subsystems.

Each of the steps of the method described above may be further performed as described herein. In addition, the method described above may include any other step(s) of any other method(s) described herein. Furthermore, the method described above may be performed by any of the systems described herein.

Another embodiment relates to a non-transitory computer-readable medium storing program instructions executable on one or more computer systems for performing a computer-implemented method for training a machine learning model. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
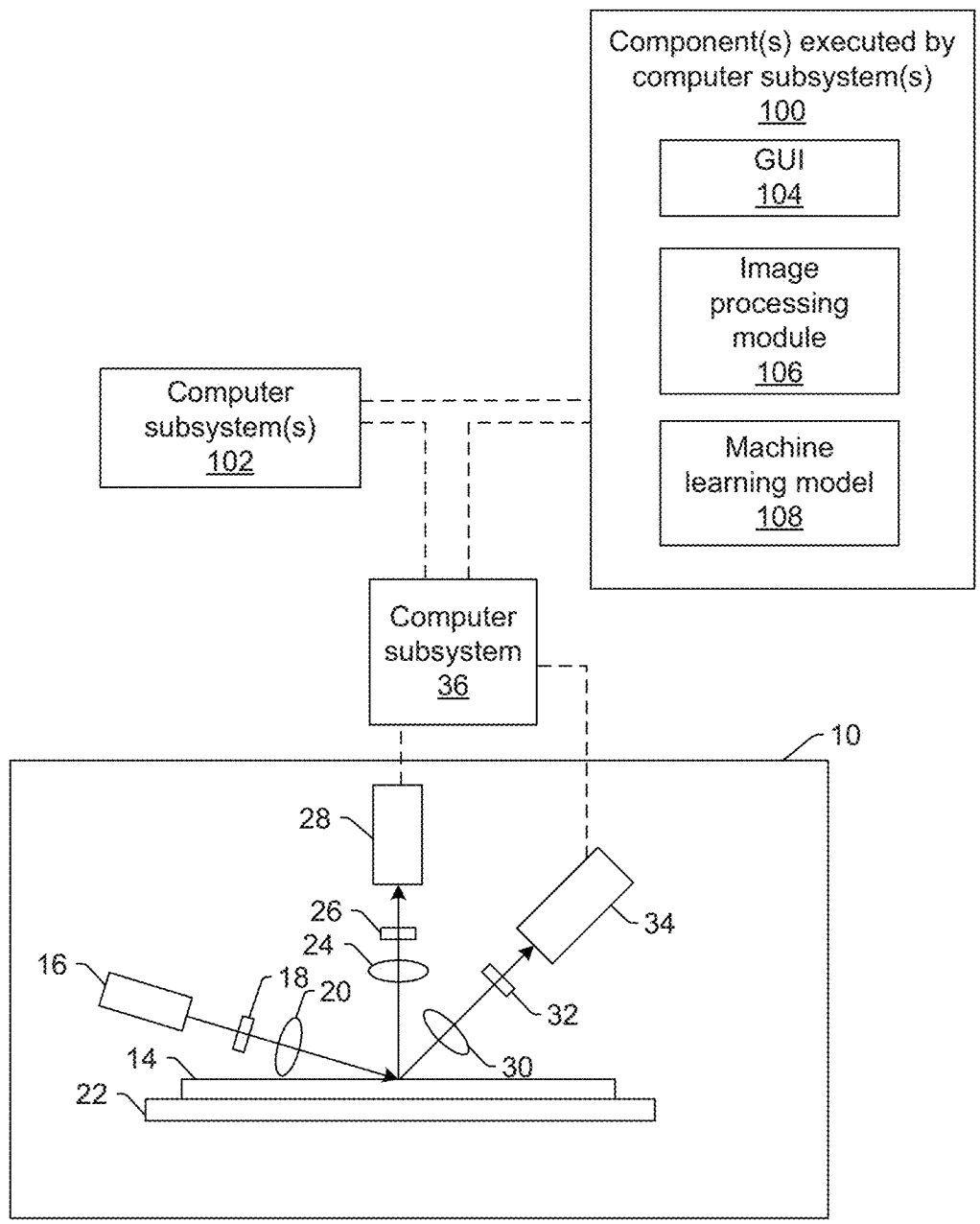
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design," "design data," and "design information" as used interchangeably herein generally refer to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In addition, the "design," "design data," and "design information" described herein refers to information and data that is generated by semiconductor device designers in a design process and is therefore available for use in the embodiments described herein well in advance of printing of the design on any physical specimens such as reticles and wafers.

"Nuisances" as that term is defined herein are defects that a user does not care about and/or defects that are detected as such but are not actually defects. Nuisances that are not actually defects even though they are detected as such may be detected due to non-defect noise sources on a specimen (e.g., line edge roughness (LER), relatively small critical dimension (CD) variation in patterned features, thickness variations, etc.) and/or due to marginalitics in the inspection system itself or its configuration used for inspection. Generally, therefore, the goal of inspection is not to detect nuisance defects on specimens such as wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to train a machine learning model. In general, the embodiments described herein are configured for improving learning based defect detection and classification with synthetic data. Currently, automatic defect detection relies on trained machine learning models that learn to find and classify defects from previously identified examples. However, existing instances of defects of interest (DOIs) are often scarce or absent. The embodiments described herein make model training possible even when no example DOIs exist and increase model performance when known DOI instances are few in number by leveraging user knowledge of defect appearance. The embodiments described herein may advantageously be configured, as described further herein, to allow a user to add synthetic defects to images with image editing tools, train classifiers on the resulting images, and view the results of classifier inference on the images.

One embodiment of a system configured to train a machine learning model is shown in FIG. 1. The system includes one or more computer subsystems (e.g., computer subsystem 36 and computer subsystem(s) 102) and one or more components 100 executed by the one or more computer subsystems. In some embodiments, the system includes imaging system (or subsystem) 10 configured for generating images of a specimen. In the embodiment of FIG. 1, the imaging subsystem is configured for scanning light over or directing light to a physical version of the specimen while detecting light from the specimen to thereby generate the images for the specimen. The imaging subsystem may also be configured to perform the scanning (or directing) and the detecting with multiple modes.

In one embodiment, the specimen is a wafer. The wafer may include any wafer known in the art. In another embodiment, the specimen is a reticle. The reticle may include any reticle known in the art.

In one embodiment, the imaging subsystem is configured as an optical based imaging subsystem. In the embodiment of the system shown in FIG. 1, optical based imaging subsystem 10 includes an illumination subsystem configured to direct light to specimen 14. The illumination subsystem includes at least one light source. For example, as shown in FIG. 1, the illumination subsystem includes light source 16. The illumination subsystem may be configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen.

The imaging subsystem may be configured to direct the light to the specimen at different angles of incidence at different times. For example, the imaging subsystem may be configured to alter one or more characteristics of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different oblique angle of incidence or a normal (or near normal) angle of incidence.

In some instances, the imaging subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing the light having different or the same characteristics to the specimen at different or the same angles of incidence sequentially or simultaneously.

In one embodiment, light source 16 is a broadband plasma (BBP) light source. In this manner, the light generated by the light source and directed to the specimen may include broadband light. However, the light source may include any other suitable light source such as a laser, which may include any suitable laser known in the art and may be configured to generate light at any suitable wavelength(s) known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the imaging subsystem may be configured to alter one or more of the elements of the illumination subsystem based on the type of illumination to be used for imaging.

The imaging subsystem may also include a scanning subsystem configured to cause the light to be scanned over the specimen. For example, the imaging subsystem may include stage 22 on which specimen 14 is disposed during inspection. The scanning subsystem may include any suitable mechanical and/or robotic assembly (that includes stage 22) that can be configured to move the specimen such that the light can be scanned over the specimen. In addition, or alternatively, the imaging subsystem may be configured such that one or more optical elements of the imaging subsystem perform some scanning of the light over the specimen. The light may be scanned over the specimen in any suitable fashion such as in a serpentine-like path or in a spiral path.

The imaging subsystem further includes one or more detection channels. At least one of the one or more detection channels includes a detector configured to detect light from the specimen due to illumination of the specimen by the subsystem and to generate output responsive to the detected light. For example, the imaging subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging subsystem that includes two detection channels, the imaging subsystem may include a different number of detection channels (e.g., only one detection channel or two or more detection channels). In one such instance, the detection channel formed by collector 30, element 32, and detector 34 may form one side channel as described above, and the imaging subsystem may include an additional detection channel (not shown) formed as another side channel that is positioned on the opposite side of the plane of incidence. Therefore, the imaging subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging subsystem may also include two or more side channels configured as described above. As such, the imaging subsystem may include at least three channels (i.e., one top channel and two side channels), and each of the at least three channels has its own collector, each of which is configured to collect light at different scattering angles than each of the other collectors.

As described further above, each of the detection channels included in the imaging subsystem may be configured to detect scattered light. Therefore, the imaging subsystem shown in FIG. 1 may be configured for dark field (DF) imaging of specimens. However, the imaging subsystem may also or alternatively include detection channel(s) that are configured for bright field (BF) imaging of specimens. In other words, the imaging subsystem may include at least one detection channel that is configured to detect light specularly reflected from the specimen. Therefore, the imaging subsystems described herein may be configured for only DF, only BF, or both DF and BF imaging. Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art such as photo-multiplier tubes (PMTs), charge coupled devices (CCDs), time delay integration (TDI) cameras, and any other suitable detectors known in the art. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the imaging subsystem may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate image signals or image data. Therefore, the imaging subsystem may be configured to generate the images described herein in a number of ways.

It is noted that FIG. 1 is provided herein to generally illustrate a configuration of an imaging system or subsystem that may be included in the system embodiments described herein or that may generate images that are used by the system embodiments described herein. Obviously, the imaging subsystem configuration described herein may be altered to optimize the performance of the imaging subsystem as is normally performed when designing a commercial imaging system. In addition, the systems described herein may be implemented using an existing system (e.g., by adding functionality described herein to an existing system) such as the 29xx/39xx and Puma series of tools that are commercially available from KLA, Milpitas, Calif. For some such systems, the embodiments described herein may be provided as optional functionality of the system (e.g., in addition to other functionality of the system). Alternatively, the imaging subsystem described herein may be designed "from scratch" to provide a completely new imaging subsystem.

Computer subsystem 36 may be coupled to the detectors of the imaging subsystem in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions described further herein using the output of the detectors.

The computer subsystems shown in FIG. 1 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Figure 1A:
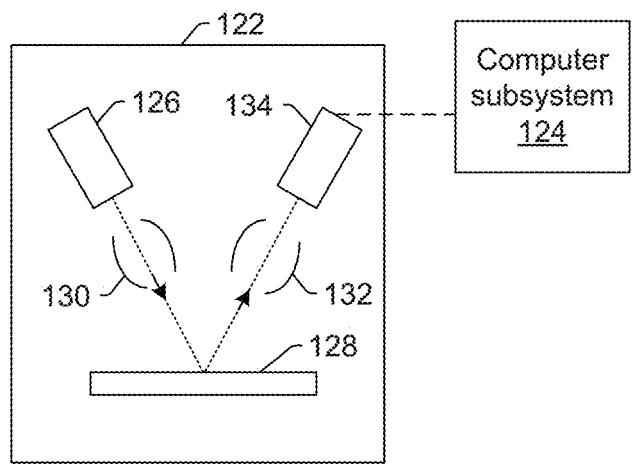

Although the imaging subsystem is described above as being an optical or light-based imaging subsystem, in some embodiments, the imaging subsystem is configured as an electron beam based imaging subsystem. In one such embodiment shown in FIG. 1a, the imaging subsystem includes electron column 122 coupled to computer subsystem 124. As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam subsystem may be configured to use multiple modes to generate images of the specimen as described further herein (e.g., with different illumination angles, collection angles, etc.). The multiple modes of the electron beam subsystem may be different in any image generation parameters of the imaging subsystem.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform one or more functions described further herein for the specimen using output generated by detector 134. Computer subsystem 124 may be configured to perform any additional step(s) described herein. A system that includes the imaging subsystem shown in FIG. 1a may be further configured as described herein.

It is noted that FIG. 1a is provided herein to generally illustrate a configuration of an electron beam subsystem that may be included in the embodiments described herein. As with the optical subsystem described above, the electron beam subsystem configuration may be altered to optimize the performance of the imaging subsystem as is normally performed when designing a commercial imaging system. In addition, the systems described herein may be implemented using an existing system (e.g., by adding functionality described herein to an existing system) such as the electron beam tools that are commercially available from KLA. For some such systems, the embodiments described herein may be provided as optional functionality of the system (e.g., in addition to other functionality of the system). Alternatively, the system described herein may be designed "from scratch" to provide a completely new system.

Although the imaging subsystem is described above as being an optical or electron beam subsystem, the imaging subsystem may be an ion beam based imaging subsystem. Such an imaging subsystem may be configured as shown in FIG. 1a except that the electron beam source may be replaced with any suitable ion beam source known in the art. In addition, the imaging subsystem may be any other suitable ion beam subsystem such as those included in commercially available focused ion beam (FIB) systems, helium ion microscopy (HIM) systems, and secondary ion mass spectroscopy (SIMS) systems.

As noted above, the imaging subsystem is configured for scanning energy (e.g., light or electrons) over a physical version of the specimen thereby generating actual images for the physical version of the specimen. In this manner, the imaging subsystem may be configured as an "actual" subsystem, rather than a "virtual" subsystem. A storage medium (not shown) and computer subsystem(s) 102 shown in FIG. 1 may also or alternatively be configured as a "virtual" system. Systems and methods configured as "virtual" inspection systems are described in commonly assigned U.S. Pat. Nos. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents. For example, the one or more computer subsystems described herein may be further configured as described in these patents.

As further noted above, the imaging subsystem may be configured to generate images of the specimen with multiple modes. In general, a "mode" is defined by the values of parameters of the imaging subsystem used for generating images of a specimen or the output used to generate images of the specimen. Therefore, modes that are different may be different in the values for at least one of the imaging parameters of the imaging subsystem. For example, in one embodiment of an optical subsystem, different modes use at least one different wavelength of light for illumination. The modes may be different in the illumination wavelength as described further herein (e.g., by using different light sources, different spectral filters, etc.) for different modes. In another embodiment, different modes use different illumination channels of the imaging subsystem. For example, as noted above, the imaging subsystem may include more than one illumination channel. As such, different illumination channels may be used for different modes.

In one embodiment, the images are generated by an inspection subsystem. For example, the optical and electron beam imaging subsystems described herein may be configured as inspection subsystems. In this manner, the one or more images used in the embodiments described herein are generated by an inspection subsystem in some embodiments. In another embodiment, the imaging subsystem is a defect review subsystem. For example, the optical and electron beam imaging subsystems described herein may be configured as defect review subsystems. In particular, the embodiments of the imaging subsystems described herein and shown in FIGS. 1 and 1a may be modified in one or more parameters to provide different imaging capability depending on the application for which they will be used. In one such example, the imaging subsystem shown in FIG. 1 may be configured to have a higher resolution if it is to be used for defect review rather than for inspection. In other words, the embodiments of the imaging subsystem shown in FIGS. 1 and 1a describe some general and various configurations for an imaging subsystem that can be tailored in a number of manners that will be obvious to one skilled in the art to produce imaging subsystems having different imaging capabilities that are more or less suitable for different applications.

The one or more computer subsystems may be configured for acquiring the images for the specimen generated by an imaging subsystem described herein. Acquiring the images may be performed using one of the imaging subsystems described herein (e.g., by directing light or an electron beam to the specimen and detecting light or an electron beam, respectively, from the specimen). In this manner, acquiring the images may be performed using the physical specimen itself and some sort of imaging hardware. However, acquiring the images does not necessarily include imaging the specimen using imaging hardware. For example, another system and/or method may generate the images and may store the generated images in one or more storage media such as a virtual inspection system as described herein or another storage media described herein. Therefore, acquiring the images may include acquiring the images from the storage media in which they have been stored.

The component(s), e.g., component(s) 100 shown in FIG. 1, executed by the computer subsystem(s), e.g., computer subsystem 36 and/or computer subsystem(s) 102, include a graphical user interface, e.g., GUI 104 configured for displaying one or more images for a specimen and image editing tools to a user.

Figure 2:
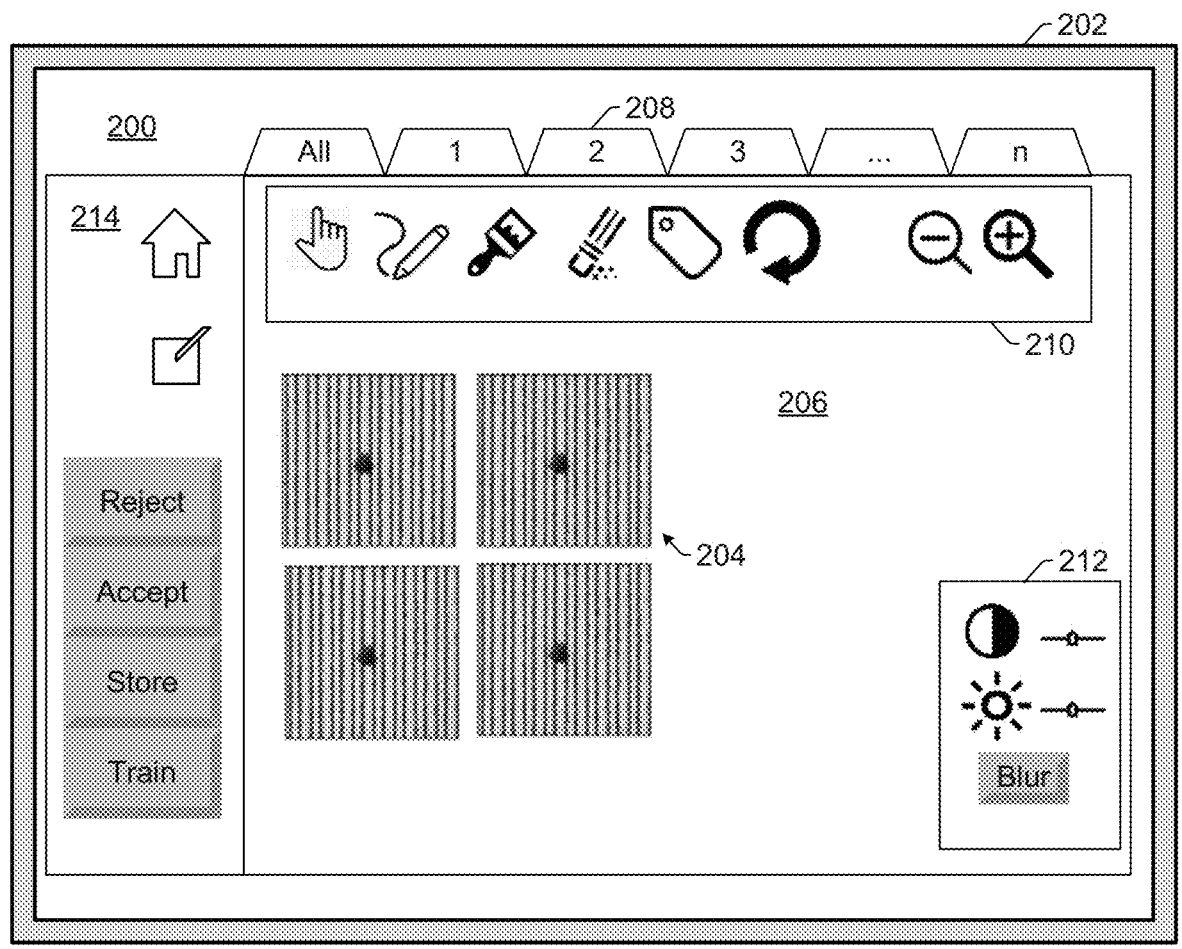
FIG. 2 is a schematic diagram illustrating one embodiment of a graphical user interface (GUI) that may be included in the embodiments described herein.

The user can use the GUI to view various types of images described herein. In one embodiment, the one or more images displayed in the GUI are images included in an initial training set. In this manner, the GUI may be configured to allow users to view images in an initial training set. One embodiment of a GUI that may be included in the system embodiments is shown in FIG. 2. This figure is merely meant to illustrate many of the possible functionalities that can be provided by the GUI included in the embodiments described herein. Obviously, additional functionalities can be added to the GUI and it would still be within the scope of the embodiments described herein. In addition, the placement and appearance of elements and images displayed in the GUI can be changed from that shown in FIG. 2 in any suitable way as would be done when creating a commercial product.

GUI 200 is shown in FIG. 2 displayed in screen 202 of a display device (not shown), which may include any suitable display device that may be included in or coupled to the computer subsystems described herein. Images 204 may be displayed in area 206, and the images that are displayed in the area may include any of those described herein. In some instances, GUI 200 may include tabs 208, which can correspond to different portions of the defects for which images can be displayed. For example, the "All" tab shown in FIG. 2 may be selected by the user to view all of the available images for the specimen. The tabs 1, 2, 3, . . . , n may correspond to different classes of the defects, and a user may select one of these tabs to show only those defects that are assigned to the selected class. The classes may include various DOI classes, where for instance tab 1 may correspond to a first DOI class, tab 2 may correspond to a second DOI class, and so on. One or more of the tabs may, however, correspond to nuisances detected on the specimen. In addition, one of the tabs may be for defects having an unknown classification. Additional tabs may be for showing different types of images such as test images, reference images, difference images, multi-mode images, and the like. Such images are described further herein. In general, therefore, the GUI is preferably configured so that the user can select from a variety of different options for which images they would like to view in the GUI.

Figure 4:
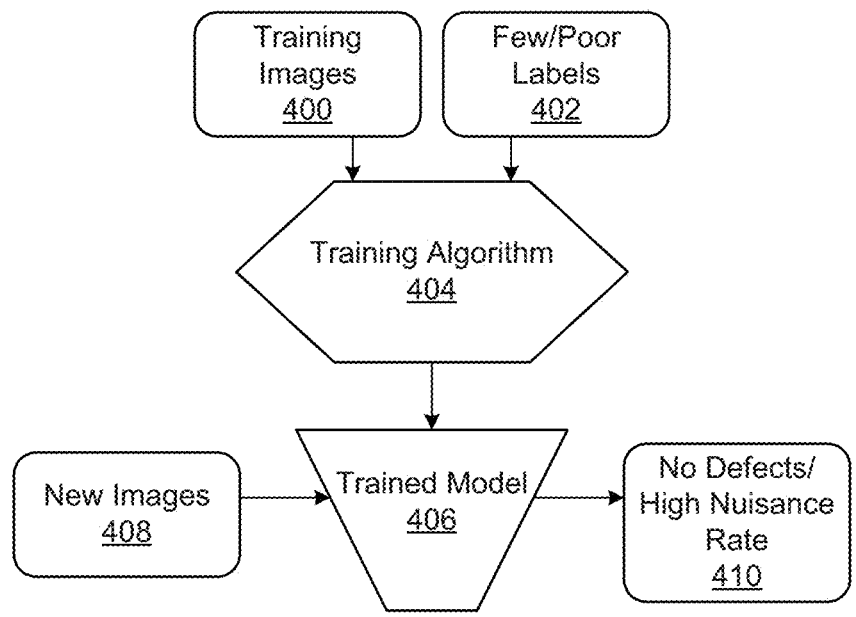

Although the GUI is shown in FIG. 2 with four images 204 in area 206, the GUI may show as many (or as few) images for the specimen that are available and/or are selected to be viewed by the user. In addition, although the images shown in FIG. 4 are all the same, it is to be understood that the GUI may shown different types of images at the same time (e.g., different images generated with different modes and/or a test, reference, and difference image for a single defect (or more than one defect)).

The GUI is also configured for receiving input from the user. The input may be received from the user in any suitable manner. For example, the GUI may include one or more graphical input devices, which may include one or more of the icons and/or buttons described herein. But the graphical input device(s) may include any suitable such devices known in the art. The user may also use one or more input devices (not shown) of the computer subsystem such as a keyboard, touch screen, mouse, electronic pen, etc. that are coupled to the GUI by interface software and/or components (not shown). Those input devices and interface software/components may include any suitable such commercially available devices, software, and components.

The input includes one or more alterations to at least one of the one or more images using one or more of the image editing tools. The image editing tools may include editing, annotation, and other features described herein. The image editing tools may include any intuitive, easy to use image editing tools known in the art. The image editing tools also preferably are capable of producing synthetic defects that can reliably be used to train effective machine learning models. "Synthetic defects" as that term is used herein is defined as any defect that is intentionally and artificially caused in an image of a specimen. In this manner, "synthetic defects" are not defects that are found in actual images generated by imaging a specimen with imaging hardware and do not therefore correspond to actual defects located on a physical specimen. The embodiments described herein provide multiple ways to create synthetic defects based on input received from a user. A machine learning model-training interface with image editing tools integrated therein is believed to be a new feature provided by the embodiments described herein.

Some image editing tools that can be used by the user to input the alteration(s) are shown in FIG. 2. As shown in FIG. 2, different groups of image editing tools may be shown in different locations in the GUI, although the image editing tools may be arranged in any suitable manner in the GUI. One portion 210 of the image editing tools include from left to right in the GUI, a selecting icon, a drawing icon, a painting icon, an erasing icon, a tagging (or annotation) icon, a rotation icon, and zoom out and in icons. The user may click or otherwise select the icons to perform one or more alterations to one or more of the images that are displayed in the GUI. The icons can be used to perform the alterations and functions described further herein. Additional portion 212 of the image editing tools include from top to bottom in portion 212, a contrast icon with a slider bar for changing the contrast of an image or a selected portion of an image, a brightness icon also with a slider bar that can be used in a similar manner, and a blur button. Each of these image editing tools may be selected and used by a user as described further herein. All of the icons shown in FIG. 2 may have any suitable configuration and possibly additional usability or functionality available with them such as drop down or pop-up menus for displaying additional options associated with each image editing tool, radio buttons for turning on or off certain functionality associated with the image editing tools, and the like.

The GUI may also include navigation window 214, which may include one or more options that can be applied to individual images or globally to all of the images and/or to navigate within the GUI. For example, as shown in window 214 from top to bottom, these functions may include a home icon that can be selected to change the GUI to a home screen, an editing icon that can be selected to enable image editing tools in the GUI, a reject button for rejecting changes or images, an accept button for accepting changes or images, a store button for storing any changes to the images made in the GUI, and a train button that can be used as described further herein to initiate training of a machine learning model. The navigation window (and/or any other portion of the GUI) may include other tools (not shown) or functions that are commonly provided by GUIs like "save," "save as," "open," "close," "undo," "redo," functions. The GUI may also include additional tools (not shown) for moving through the images such as "next" and "previous" buttons, scrolling bars, searching tools, and the like.

In one embodiment, the one or more alterations include annotating the at least one of the one or more images with a defect class label. For example, the GUI may be configured to allow the user to annotate portions of the images displayed in the GUI with class labels. In one such example, the user may select the tag icon shown in the GUI of FIG. 2 to annotate an image or a portion of an image, which may be selected by a user using the selecting icon in the GUI. The annotation may be a defect class label in that it may indicate a type of DOI that the user has identified for a defect. Such as a defect class label may be a number such as that described above associated with a type of DOI but it also may be an actual name such as "bridges," "opens," "particles," and the like describing the DOI type. The annotation may also be a tag, label, or any other appropriate indication that an image contains a nuisance, which may be used to correct an incorrectly classified defect, to indicate a newly identified nuisance, and/or to confirm a nuisance classification. The annotation may also indicate the presence or absence of a defect, which may be used to indicate a newly identified defect found visually by a user in an image displayed in the GUI, to indicate that a defect detected as such is not actually a defect, to confirm that a detected defect is actually a defect/a non-defective image is actually non-defective, or to label or tag one or more images that can be used as "non-defective" examples for training.

In another embodiment, the one or more alterations include creating a synthetic defect in the at least one of the one or more images. For example, the GUI may be configured to allow the user to add defects to at least one of the images using a suite of image editing tools. The user may add defects to one or more of the images, and the defect that is added to any one of the images may be the same or different as any of the other synthetic defects. For example, a user may add the same synthetic defect to different images, which may be useful if the same DOI type is known to show up in different areas in a design for the specimen. The user may also or alternatively add different synthetic defects to different instances of the same image. The different synthetic defects may be different types of defects, which may be useful when a portion of a design is known to be susceptible to different types of defects, but the different synthetic defects may also be the same type of defect but with one or more different characteristics such as those described further herein. Creating the synthetic defect may be performed using one or more of the image editing tools described further herein including, but not limited to, a drawing tool, a painting tool, an erasing tool, cut and paste tools, and the like. For example, the user may manually draw or paint a synthetic defect into an image in the GUI, the user may manually erase a portion of an image in the GUI to thereby create a synthetic defect in the image, and the user may also cut and/or copy a defect image or a portion of an image and paste it into another image to create a synthetic defect in the other image.

In a further embodiment, the one or more alterations include one or more manually drawn alterations input by the user with a drawing tool included in the image editing tools. The drawing tool may include the drawing, painting, and erasing icons shown in portion 210 of the GUI in FIG. 2. The drawing tool may be used for freehand drawing of a polygon or irregular shape. The user may manually draw alterations on any available images to thereby insert or create painted synthetic defects therein. For example, the GUI may display a variety of reference images generated for a specimen or specimens, which are images that are subtracted from test images to detect defects therein, and/or other defect-free images. The reference images may be generated by imaging an actual specimen (as would be the case for die-to-die or cell-to-cell defect detection) or by simulating a reference image from a design for the specimen. The defect-free images may also be any images generated by imaging the specimen on which defect detection has been performed and in which no defect has been found. In this manner, the images used for defect painting may already look like real specimen images, and the user may only need to modify the portions of the images in which the defects are being added to create the synthetic defect images. However, manually drawing alteration(s) in image(s) may be performed using any other images described herein. For example, a user may manually draw alterations to a portion of a test image corresponding to a DOI to thereby create different versions of the DOI having different characteristics. The user may also make alterations to a defect image to manually draw in additional defects. The manually drawn alterations may also be made using the erase icon to manually remove one or more defects and/or patterned features or to alter them in some way.

In another embodiment, the one or more alterations include pasting a portion of an image corresponding to a known DOI into the at least one of the one or more images. For example, the image editing tools may include a copy/paste tool that can be used to copy/paste an image patch from one image to another. In this manner, a defect image, which may be an image of an actual defect found on an actual specimen or a synthetic defect created by the user, may be copied and pasted from one image to another image to thereby add that defect to the other image. Such functionality may be particularly useful when a DOI is known to be possible in different areas in a design for the specimen.

After the image of a known DOI has been pasted into an image, the resulting image may also be altered by the user in any other manner described herein. For example, a user can copy a region of an image and paste it into another area of that image or another image. The user can then change one or more characteristics of the pasted region including, but not limited to, rotation, magnification, and intensity. For example, a user can rotate the copied patch image. The user can also change the magnification of the copied image patch by shrinking or enlarging the copied image patch. The user can also change the intensity of the copied image patch to darken or brighten it. A user can also copy and paste any given edit (i.e., an edited region created with any of the functionalities described herein). In other words, a portion of an image can be copied and pasted and then altered or vice versa. Each of these functions may be performed using the image editing tools described herein and shown in FIG. 2.

In an additional embodiment, the alteration(s) include creating a synthetic defect in the at least one of the one or more images based on one or more characteristics of a known DOI for the specimen. In one such example, the image editing tools may include a number of predetermined drawing shapes (not shown) that a user can add to a specimen image and manipulate one or more characteristics thereof such as dimensions, aspect ratio, gray level intensity (e.g., a single grayscale value for the whole shape), and the like. To edit gray level, a user can select a region in an image and set the grey level (black-white) of that region. The options include setting grey level by a value (i.e., from black to white) or by "sampling" a region of the image to match that region's color. The options also include selecting a region using a rectangular selection tool or by drawing an arbitrary free-form boundary. The predetermined drawing shapes may include, for example, squares (or rectangles), circles (or ellipses), triangles, hexagons, and other polygons (including regular and irregular polygons). In one such example, the image editing tools may include a rectangular clone selection (not shown). The image editing tools may be configured such that a user can drag a predetermined shape into a particular location in a specimen image and then modify the predetermined shape using a mouse or other graphical input device to move or scale the boundaries of the predetermined shape and/or using one or more drop down menus or other characteristic selection tools to thereby select the appropriate characteristics that approximate the characteristics of the expected DOIs. If the synthetic defect is created based on characteristic(s) of a known DOI, an actual image of the known DOI is not needed to create such synthetic defects. For example, if a user knows, e.g., from experience or from inspection results for other specimens having similar patterned features as a specimen for which a synthetic defect is being created, what a DOI will "look" like and where it might be located, the user can create the synthetic defect based on that knowledge without requiring an actual image of the DOI. In one such example, if a user knows from experience that lines in a design for a specimen are prone to bridge defects, the user may choose to create a synthetic defect between those lines in an image using one or more of the image editing tools described herein and based on the expected characteristics of the bridge defect.

In some embodiments, the alteration(s) include one or more modifications to a portion of the at least one of the one or more images corresponding to a defect, and generating the at least one modified image includes generating a new image based on the one or more modifications. In one such embodiment, the one or more modifications include scaling, rotating, edge blurring, or intensity modification. Modifications like these can be used for defect augmentation. The modifications may also be applied to synthetic defects. For example, the GUI may display a number of available modifications like those described above, and the GUI may enable the modifications to be applied to any of the images displayed in the GUI including real defect images and synthetic defect images. The real defect images may include test images and/or difference images (where a difference image is generated by subtracting a reference image from a test image).

The modifications may be displayed in the GUI with one or more predetermined and/or selectable options for the modifications. For example, for a blurring modification, the GUI may display different types of blur that can be applied to the defect images. The different types of blur may correspond to different functions that can be used to apply the blur to the edges of the defects. One such example is Gaussian blur. The blurring may be applied to a synthetic defect that is generated at the expected location of a DOI with roughly the same shape, size, intensity, etc. as the expected DOI and with a single gray level value. The blurring may be applied to the synthetic portions of the images to better approximate the images that would be produced for the DOI by an imaging subsystem or to provide multiple possible images that might be generated for the DOI by an imaging subsystem, which may be advantageous as described further herein.

In this manner, the modifications that are available in the GUI may provide the user with tools that can be used to make the synthetic defects appear more like real defect images. But the modifications may also be used to generate multiple variations of a single DOI. For example, a scaling modification may be used to generate multiple instances of a single DOI type having different sizes, aspect ratios, etc., which may be appropriate when DOIs can have different sizes on a specimen and/or may have different sizes in different portions of the design on the specimen. In a similar manner, different variations of the same DOI type may be generated using the rotation and intensity modification functions. Such modifications may be useful when a DOI type is known to have different orientations on the specimen and/or be at different locations within a design on the specimen and/or when a DOI type is known to possibly have different gray level intensities on a specimen. Such modifications can also generate multiple instances of a DOI that can, when used for training a machine learning model as described herein, provide a more robust machine learning model. For example, a user may use a gray level intensity modification function in the GUI to generate multiple instances of a single DOI type in a single location in a design for the specimen with different gray level intensity values. All of those multiple instances (or one or more of them) may then be used to train a machine learning model as described further herein. The trained machine learning model may therefore be more robust to wafer-to-wafer or DOI-to-DOI variations, e.g., by setting one or more parameters of the machine learning model to detect and/or classify all of the multiple instances of one DOI with different characteristics as the DOI.

As described above, therefore, the GUI may display different types of images to the user and the user may use any one or more of those images to create synthetic or painted defects. The images may include test images, reference images, and difference images. For any one location on the specimen or in a design for the specimen, the GUI may display one or more of the different types of images such as only the test images or the test images, reference image, and difference images. The GUI may also display different images corresponding to the same portion of the design generated at different locations on the specimen such as in different dies on the specimen and/or the same set of patterned features in the design at different locations in one or more dies on the specimen.

Furthermore, in some instances, the imaging subsystem may generate images for a single location on the specimen in multiple modes (as described further herein), and images generated in multiple modes may be used in combination for defect detection and/or classification. When there are multi-mode images available for a specimen location, a design location, or a defect, the GUI may display all of those multi-mode images to the user and the user may input one or more alterations to any one or more of the displayed multi-mode images in any manner described herein. In one such example, if a user is using the GUI to generate variations of a DOI, the user may choose to make the same or different modifications to the DOI image generated in different modes. The changes made in one image may also be applied across an arbitrarily deep stack of images. For example, unlike most image editors that are geared towards color and grey images, which are 3 and 1 channels deep respectively, the embodiments described herein support arbitrary depth in the channel dimension (since there may be upwards of 6 perspectives of the same specimen site fed into a machine learning model). In this manner, the modifications to the images that can be made by the user with the image editing tools provided in the GUI may be a kind of simulation in that functions may be applied by the computer subsystem(s) as described herein to simulate various defect images.

In addition, if one type of image is generated by a user for a DOI with the image editing tools, the GUI may display simulation options for that image to the user, which may include, for example, simulating a difference image from a test image or simulating an image in a different mode from the mode corresponding to the image edited by the user. The GUI may also display options that can be used to modify one image with another image, e.g., if a user selects two images, a functionality may be made available for subtracting one of the images from the other. In this manner, a user may generate a difference image for a synthetic defect test image to see what the difference image would look like. Any such images generated for the DOI may be used in the training described further herein. The simulations may be performed with any suitable software and/or components such as one or more of the machine learning models described herein.

The component(s) also include an image processing module, e.g., image processing module 106, configured for applying the one or more alterations to the at least one of the one or more images thereby generating at least one modified image and storing the at least one modified image in a training set. For example, once a user has made one or more alterations to an image, the user may select the accept and/or store button shown in the GUI of FIG. 2. The image processing module may then simply store the altered image but the image processing module may also make any other changes to the image files or data in response to the alterations made by the user. In one such example, if a user has cut and pasted a defect image into another image, the image processing module may alter the original image data to include that defect image data such that the changes can be preserved when the altered image data is stored. Many such image processing modules and software are commercially available and may be used in the embodiments described herein. Basically, any software, component, hardware, etc. that can be used to change image data based on changes made by a user in the GUI and then store that changed image data may be used as the image processing module of the embodiments.

In one embodiment in which the one or more images displayed in the GUI are images included in an initial training set, the storing includes adding the at least one modified image to the initial training set thereby generating the training set. In this manner, the image processing module may be configured to add user-drawn defects to training images. For example, in the GUI shown in FIG. 2, images 204 may be already in a training set. After a user has modified one or more of the images in any manner described herein to change the images or to create new images, the modified or new images can be added to the training set. In one such example, if the user selects one of the accept or store buttons shown in FIG. 2, the GUI may display a prompt asking if the user wants to store the changes or the new images in the training set. In other instances, the images may simply include images that were generated for the specimen, e.g., using the imaging subsystem and a trained, best known defect detection and/or classification method or system. After the user has modified one or more of those images and/or created new images, the user may select any one or more of the specimen images, the altered images, and/or the new images and then select accept or store, which may cause the GUI to display a query asking if the user wants to generate a new training set. If the user elects to generate a new training set, then additional prompts may be displayed such as for training set name, storage location, etc. as might be used for generating any new data file. In this manner, any alterations to any images that are made by a user in the GUI can be used to create a new training set and/or to update or modify an existing training set.

Figure 3:
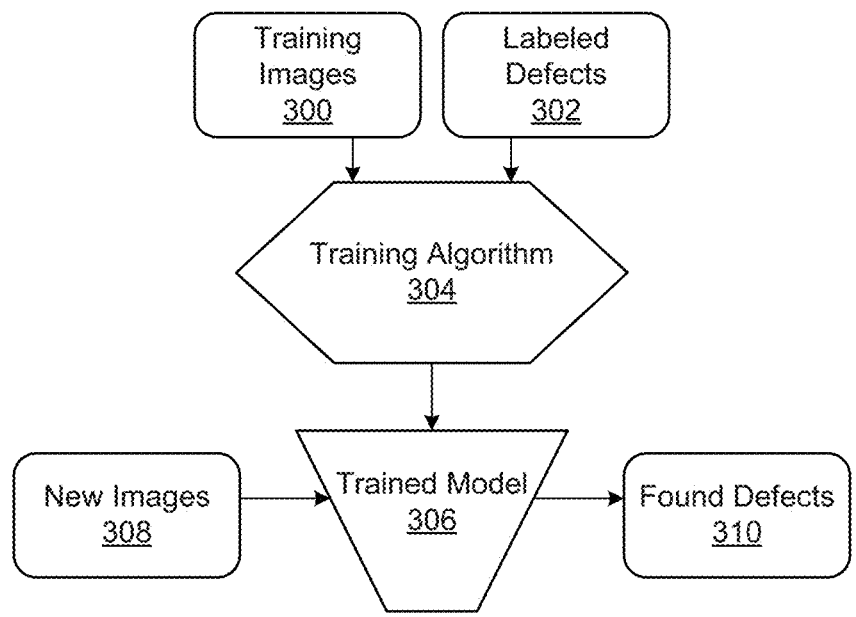
FIGS. 3-5 and 7 are flow charts illustrating embodiments of various steps that may be performed by the embodiments described herein.

The embodiments described herein enable the exploitation of machine learning models such as deep neural networks and others described herein for defect detection and/or classification while mitigating the difficulties of data collection. For example, FIG. 3 illustrates an ideal training sequence in which a model is trained on plentiful, correct data. As shown in FIG. 3, training images 300 and labeled defects 302 may be input to training algorithm 304, which may be configured to perform training of a machine learning model. Training the machine learning model produces trained model 306. The trained model may then be used for defect detection and/or classification. For example, new images 308 may be input to the trained model, which may generate output including, but not limited to, found defects 310.

In actuality, frequently, training defects are few in number, poorly labeled, or non-existent. FIG. 4 illustrates such a commonly encountered training sequence. For example, as shown in FIG. 4, training images 400 may include few and/or poor examples of DOIs and nuisances. Therefore, the training images may be input to training algorithm 404 with few and/or poor labels 402. The training algorithm may perform the training using the training images and the labels as described herein thereby generating trained model 406. The trained model may then be used for defect detection and/or classification. For example, new images 408 may be input to the trained model, which generates output 410 that includes no defects and/or a relatively high nuisance rate.

In another embodiment, the one or more images displayed in the GUI are images in an initial training set, the initial training set does not include any instances of a known DOI for the specimen, the one or more alterations include creating a synthetic defect in the at least one of the one or more images based on one or more characteristics of the known DOI, and the storing includes adding the at least one modified image to the initial training set thereby generating the training set. For example, existing instances of DOIs are often absent. Therefore, no DOIs of one or more types may be present in the training images. One reason that it may be difficult to generate training images of actual DOIs found on specimens is because DOIs can be particularly infrequent especially when compared to nuisances. Not having any DOIs in the training set is problematic since a machine learning model trained with such a training set will most likely not be able to detect DOIs in new images, e.g., runtime images. The embodiments described herein, however, make model training possible even when no example DOIs exist by leveraging user knowledge of defect appearance. Therefore, one advantage of the embodiment described above over other currently used methods for training a defect classifier is that it allows a user to train models to detect and/or classify DOIs with zero real examples of those DOIs. The inventors have found through experimentation that models trained on only synthetic defects (i.e., with no real defects) can capture real defects during inspection.

In a further embodiment, the image(s) displayed in the GUI are images in an initial training set, the initial training set includes fewer than a predetermined number of instances of a known DOI for the specimen, the alteration(s) include creating one or more synthetic defects in the at least one of the one or more images based on one or more characteristics of the known DOI thereby generating one or more of the at least one modified image, and the storing includes adding the one or more of the at least one modified image to the initial training set thereby generating the training set. For example, existing instances of DOIs are often scarce. In particular, DOIs may be infrequent (particularly compared to nuisances) or may be substantially subtle in specimen images and therefore hard to detect. As a result, there may be relatively few DOIs present in training images, where "few DOIs" is defined as less than a predetermined minimum number known to be needed for machine learning model training. If a machine learning model is trained with such a training set of images, the machine learning model may not be able to detect DOI or may have a substantially high nuisance rate. Erroneous labeling of DOIs in training images can also cause problems for training machine learning models. Erroneous labeling may be caused by substantially subtle DOIs in specimen images and DOIs can be easy to misclassify. As a result, a machine learning model trained with such a training set may not be able to detect DOIs and/or may have a substantially high nuisance rate. The embodiments described herein, however, improve model performance even when known DOI instances are few by leveraging user knowledge of defect appearance. For example, the inventors have found through experimentation that synthetic defects can improve the performance of classifiers in cases where few real training data are available.

Figure 5:
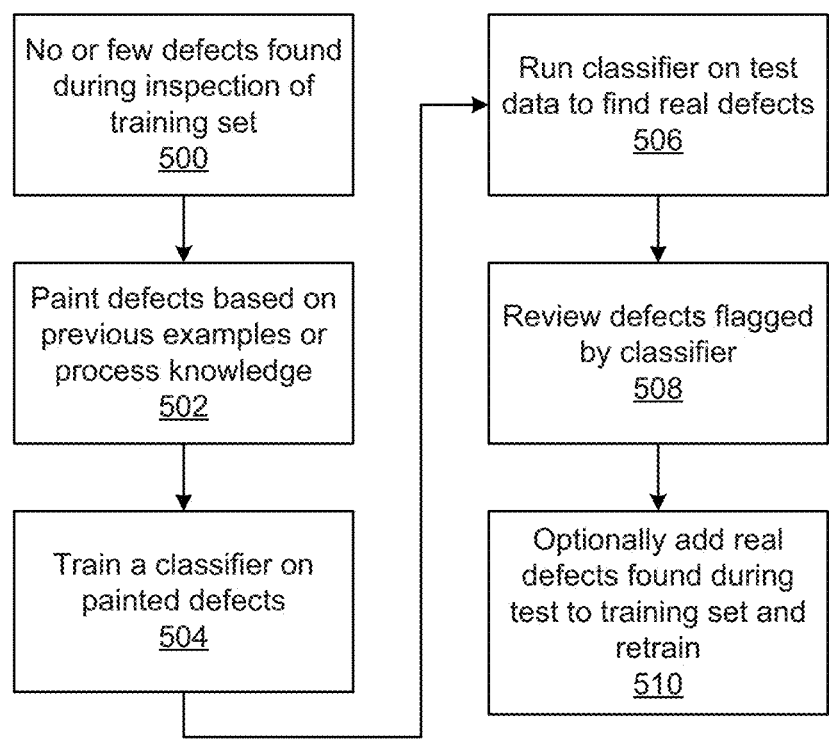

FIG. 5 illustrates one embodiment of steps that may be performed in the embodiments described above. For example, as shown in FIG. 5, step 500 may include determining if no or few defects are found during inspection of a training set. In step 502, the user may paint (or otherwise create synthetic) defects as described further herein based on previous examples or process knowledge using the GUI described herein. In this manner, in the absence of "good" training data (where "good" training data is generally defined as training data that has at least a predetermined minimum number of correctly labeled/classified DOIs and possibly also a predetermined minimum number of correctly labeled/classified nuisances), synthetic defects may be painted into or created in clean specimen images and/or other images described herein using basic image editing tools and then the images with the painted or synthetic defects can be used for the training described further herein.

The component(s) may further include a machine learning model, e.g., machine learning model 108 shown in FIG. 1, configured for performing one or more functions for the specimen using images generated for the specimen by an imaging subsystem. In one embodiment, the one or more functions include detecting defects on the specimen. In another embodiment, the one or more functions include classifying defects detected on the specimen. In this manner, the machine learning model may be configured for defect detection or defect classification. However, the machine learning model may also be configured for defect detection and defect classification. The images for the specimen that are input to the machine learning model may include runtime images or images generated for a specimen during a process such as inspection, metrology, or defect review. The machine learning model may be configured for defect detection and/or classification using such images possibly with one or more other sources of information such as design data for the specimen.

The machine learning model may include any deep learning model known in the art, including for example, a neural network, a convolutional neural network, a generative model, etc. Examples of suitable machine learning models for use in the embodiments described herein include machine learning models configured for single image detection as described in U.S. Patent Application Publication No. 2017/0140524 published May 18, 2017 by Karsenti et al., which is incorporated by reference as if fully set forth herein. The machine learning models may also be configured for defect detection and/or classification as described in commonly owned U.S. Patent Application Publication Nos. 2017/0140524 published May 18, 2017 by Karsenti et al., 2017/0148226 published May 25, 2017 by Zhang et al., 2017/0193400 published Jul. 6, 2017 by Bhaskar et al., 2017/0193680 published Jul. 6, 2017 by Zhang et al., 2017/0194126 published Jul. 6, 2017 by Bhaskar et al., 2017/0200260 published Jul. 13, 2017 by Bhaskar et al., 2017/0200264 published Jul. 13, 2017 by Park et al., 2017/0200265 published Jul. 13, 2017 by Bhaskar et al., 2017/0345140 published Nov. 30, 2017 by Zhang et al., 2017/0351952 published Dec. 7, 2017 by Zhang et al., 2018/0107928 published Apr. 19, 2018 by Zhang et al., 2018/0293721 published Oct. 11, 2018 by Gupta et al., 2018/0330511 published Nov. 15, 2018 by Ha et al., 2019/0005629 published Jan. 3, 2019 by Dandiana et al., and 2019/0073568 published Mar. 7, 2019 by He et al., which are incorporated by reference as if fully set forth herein. The embodiments described herein may be further configured as described in these patent application publications. In addition, the embodiments described herein may be configured to perform any steps described in these patent application publications.

The one or more computer subsystems are configured for training the machine learning model with the training set in which the at least one modified image is stored. For example, the computer subsystem(s) may train a classifier based on the images edited by the user. In one such example, as shown in step 504 of FIG. 5, the computer subsystem(s) may train a machine learning model such as a classifier and/or a deep neural network on painted defects or synthetic images. In this manner, the computer subsystem(s) may input the user-drawn defects to a machine learning training algorithm that trains a model to thereby improve detection and/or classifier performance. In addition, the computer subsystem(s) may train machine learning models on datasets that, as described further herein, are partly or entirely made up of user-created synthetic images in order to improve the performance of those models in classifying unseen data. Training classifiers on synthetic data to catch real events during inference is a new feature provided by the embodiments described herein.

Figure 6:
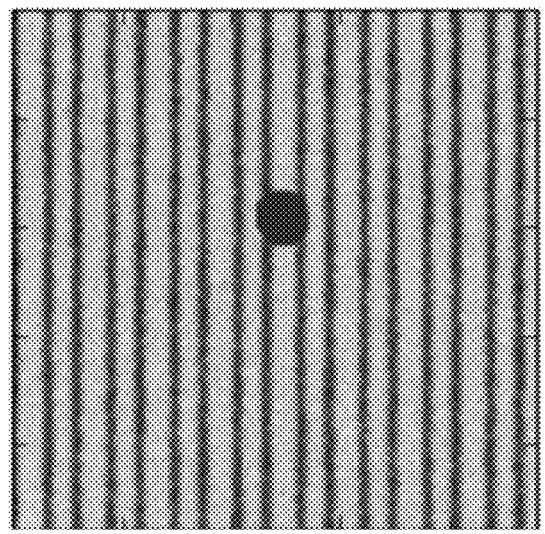
FIG. 6 includes an example of a synthetic image that may be generated using the embodiments described herein and an example of an image of a specimen in which a defect has been detected by a machine learning model trained as described herein.
Figure 6:
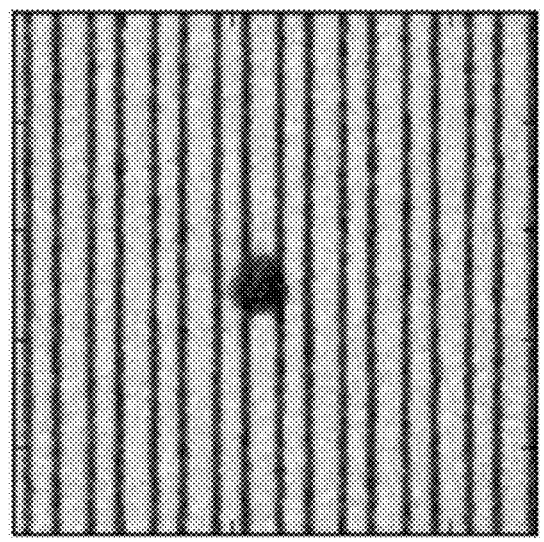

Results produced by training a machine learning model with the synthetic or painted defects described herein have shown that the trained machine learning model can catch real DOIs from synthetic examples even when the fidelity of the synthetic or painted defects to the real DOIs is relatively low. For example, FIG. 6 shows one example of a synthetic image created as described herein and one example of a real defect image that was correctly detected and classified using a machine learning model trained using the synthetic image. In particular, image 600 shown in FIG. 6 is a synthetic image that was created using a GUI configured as described herein. The synthetic defect in this image is the dark circle near the center of the image. Such a synthetic defect can be created in a non-defective image by drawing a circle in the non-defective image manually or by using a circular prototype available in the GUI image editing tools. As can be seen by comparing image 600 with real defect image 602, there are various differences between the synthetic image and the real defect image. For example, the synthetic defect image has relatively crisp, non-blurred edges while the real defect image edges have significantly more blur. In addition, the synthetic and real defect images have somewhat different shapes and somewhat different locations within the patterned features. Nevertheless, the inventors have found that a machine learning model trained with such a synthetic defect image can successfully detect and classify the real defect shown in image 602. Therefore, even if the fidelity of the synthetic defects to their real defect counterparts is relatively low, the real defects can be caught from the synthetic examples.

The one or more computer subsystems may be configured to train the machine learning model in any suitable manner such as by inputting defect and/or class labels assigned to training images and the training images to the machine learning model. The labels may be assigned to the training images by the user as described herein (e.g., via an annotation tool in the GUI) or in any other manner (by another, already trained defect classification method or system). The labels may be assigned to each training defect image and may include labels such as defect ID 1, defect ID 2, . . . defect ID n, pattern defect, bridging defect, etc. Therefore, different labels may be associated with each training defect image and/or each defect in each training defect image.

The training set may also include images other than the images modified by the user using the GUI. For example, the training set may include one or more other synthetic images, which may be generated by inserting a hypothetical defect into the design for the specimen and then generating a simulated image for the design including the hypothetical defect. In this manner, the training set may include simulated images. Such simulated images may be generated by one or more of the machine learning models described in the above-referenced patent applications. The training set may also include one or more non-defect images. For example, the training set may include images of the specimen in which no defect is or was detected. Using a training set that includes defect images and non-defect images may produce a machine learning model that is better capable of differentiating between defect images and non-defect images when the machine learning model is used for defect detection.

The one or more computer subsystems may also be configured to train the machine learning model by inputting the class labels and the training images to the machine learning model with one or more training reference images and/or a design for the specimen for which the training images were generated. For example, reference images and/or design can be inserted as the second (and possibly third) channel of the machine learning model. The reference images may include defect free images of the specimen. In this manner, the defect free images and the defect images may be input to the machine learning model as different data sets rather than a single training set of images. The reference images may include any defect free images and may be acquired in any suitable manner (e.g., by imaging a specimen and identifying images of the specimen that are defect free as reference images, by acquiring one or more images of specimens known to be defect free, by simulating the reference images from a design for a specimen, etc.). The design may include any of the design or design data described herein, which may be acquired in any suitable manner. The computer subsystem(s) may be configured to train the machine learning model using the information and images described above in any suitable manner (e.g., by inputting the images and information to the machine learning model and adjusting one or more parameters of the machine learning model until results generated by the machine learning model for the training images match labels input to the machine learning model). The computer subsystem(s) may be further configured to train the machine learning model as described in any of the patent application publications incorporated by reference above.

The GUI may be configured to display various training features. In one embodiment, the GUI is configured for displaying results of the training to the user. For example, the GUI may be configured to display various options for training the machine learning model if the user initiates training, e.g., by selecting the train button shown in FIG. 2. The training features may include any suitable options for training such as selecting one or more training or data sets to be used for training. The parameters of the machine learning model that are trained may include any adjustable parameters of the model such as weights and biases. The results of the training that are displayed in the GUI may include any suitable results that can be generated by training a machine learning model, which may include, for example, images classified as defect images, images classified as nuisances, and any other training results or characteristics of the training results. In this manner, the user interface may be a training interface, and the image editing tools may be integrated into the training interface.

In another embodiment, the GUI is configured for displaying results of the one or more functions performed by the trained machine learning model for the specimen or another specimen using the images generated for the specimen or the other specimen, respectively, by the imaging subsystem. For example, the GUI may be configured for displaying to the user the resulting machine learning model's performance on other available images. In one such example, as shown in step 506 of FIG. 5, the computer subsystem(s) may run the classifier on test data to find real defects. In addition, the user can use the GUI to view the performance of each classifier on various datasets.

In one such embodiment, the GUI is configured for receiving additional input from the user in response to displaying the results of the one or more functions performed by the trained machine learning model for the specimen or the other specimen. For example, the results of running the trained machine learning model may be displayed in a GUI as described herein, and, as shown in step 508 of FIG. 5, the user may review defects flagged by the trained machine learning model, which may be a classifier or other type of model described herein. The user may input information for the results using the GUI, which may include validating the results as described herein and/or modifying the results to correct any of the incorrect results. Modifying the results may include removing or modifying one or more labels (e.g., to change a label from "defect" to "nuisance" or "no defect" or from one defect class to another defect class). Labels may be modified in the results using, for example, an annotation tool such as that described further herein displayed in the GUI. Modifying the results may also or alternatively be performed using any other tools provided in the GUI such as dragging and dropping defects from one class group to another.

In some such embodiments, the additional input includes a validity of the results of the one or more functions performed by the trained machine learning model for the specimen or the other specimen. For example, the machine learning model may run inference (for defect detection and/or classification) on the remaining training set or other images generated for the specimen or another specimen (e.g., test data, validation data, or runtime images). The user may visually validate the detected and/or classified defects and may use the GUI to provide one or more inputs for one or more of the defects and/or nuisances to indicate whether they are valid or not. In one such example, the user may select the defects they determine to be valid and then select a validate button to save the selected defects as validated data. The user may also or alternatively indicate that any of the individual defects detected and/or classified by the machine learning model are valid or not by any other tools displayed in the GUI including, but not limited to, radio buttons for valid or invalid results, drag and drop functionality for grouping individual defects into valid or invalid results, and the like.

In additional such embodiments, the one or more functions include detecting defects on the specimen or the other specimen, the additional input includes a selection of one or more of the detected defects for the image processing module to store in the training set thereby generating a modified training set, and the one or more computer subsystems are configured for re-training the machine learning model with the modified training set. For example, as shown in step 510 of FIG. 5, the computer subsystem(s) may optionally add real defects found during a test to the training set and retrain the machine learning model.

Figure 7:
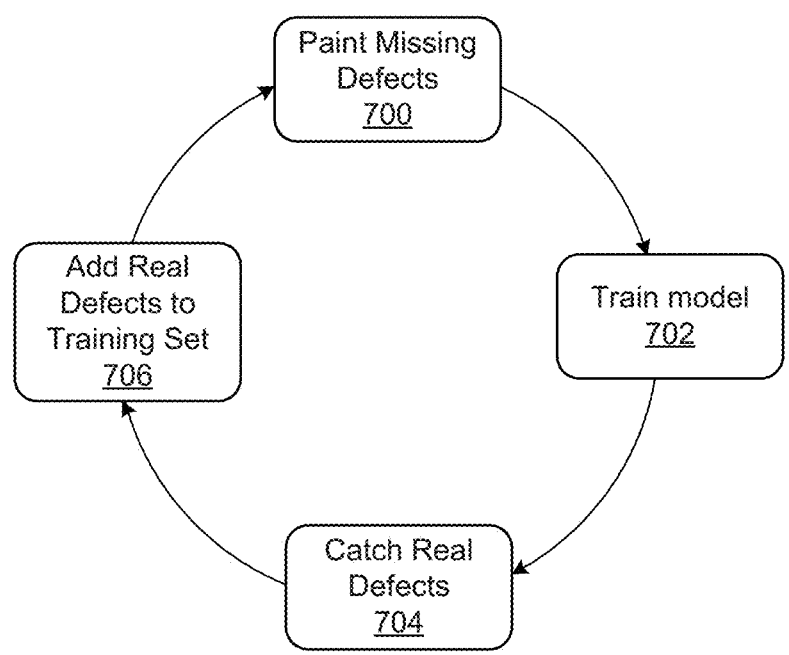

FIG. 7 illustrates one implementation of an improved annotation best known method (BKM). These steps may be performed when visual scanning for DOIs is time consuming and error prone. These steps can reduce image area to be scanned. As shown in step 700 of FIG. 7, the user may paint (or otherwise create) missing defects and/or missing defect types using the GUI configured as described herein. The computer subsystem(s) may then train the model, as shown in step 702, which may be performed as described herein. The trained model may then be used to catch real defects, as shown in step 704. Catching the real defects may be performed by applying the trained machine learning model to data or images other than the training set, and the other data may include test data, runtime data, and the like. Catching the real defects may, however, also or alternatively be performed on the remaining training set.

The results produced by the machine learning model may be displayed in the GUI as described herein, and a user may visually validate the detected defects. As shown in step 706, the image processing module may add the real defects to the training set. The real defects may include only those defects that have been validated by the user. As further shown in FIG. 7, after step 706 is performed, the user may again paint (or otherwise create) any missing defects using the GUI as described herein in step 700, and the modified training set that includes the added real defects and any new painted (or synthetic) defects may be used to retrain the model by performing step 702 again. In this manner, anytime that the machine learning model is used to detect and/or classify defects on a specimen, the results of the defect detection and/or classification may be added to the training set and then the model may be re-trained. The computer subsystem(s) may therefore be configured to perform a kind of adaptive learning in which the machine learning model may intermittently or continuously be re-trained with any (or some) newly detected and/or classified DOIs and/or nuisances, which may improve the performance of the machine learning model over time.

The embodiments described herein provide a number of advantages over previously used methods and systems for training machine learning models. For example, the embodiments described herein have better performance, e.g., improved defect detection and classification, than the currently used methods because they allow users to train a model to detect and classify DOI with zero real examples. The embodiments also provide improved defect detection and classification when few DOI examples exist, which may include unrepresented variants in defect appearance, by increasing the count of under-represented defect types to improve model quality. In addition, the embodiments described herein provide viable means for learning-based defect detection and classification without training data. The embodiments allow the user to train models using existing knowledge of defect appearance rather than relying at all or entirely on the time-consuming, error-prone, and occasionally unavailable method of collecting real data from wafer images. Therefore, the embodiments described herein can leverage expert knowledge of users when training data is unavailable or limited. In this manner, the improved defect detection, data collection, and time savings provided by the embodiments described herein make defect painting or synthetic creation of real value.

The embodiments described herein also provide improved model performance that makes the following features possible, which are unavailable in previous tool capabilities, by adding synthetic examples to training data. One new feature is catching defects for which there are no known examples. Another new feature is strengthening defect detection and classification for defects with substantially few examples. An additional new feature is varying the appearance of a given defect type to capture variants underrepresented in the training set.

The embodiments described herein also significantly reduce the time needed to find real defects (time to recipe), since with synthetic defects users can train a model for inspection substantially fast. In contrast, in currently used methods and systems, images for an entire specimen may have had to be generated to find defects (or even just a few examples of defects). The embodiments described herein provide substantially high ease of use (EOU) by training a machine learning model on synthetic defects, and that machine learning model can then be used to find "candidate" defects in the training set. The user then need only review these candidates rather than eyeballing all of the images for an entire specimen to find defects which is tedious and error prone.

Each of the embodiments described above may be combined together into one single embodiment.

Another embodiment relates to a computer-implemented method for training a machine learning model. The method includes the displaying, receiving input, applying one or more alterations, storing, and training steps described further herein. Each of the steps of the method may be performed as described further herein. The method may also include any other step(s) that can be performed by the system, computer subsystem(s), GUI, image processing subsystem, machine learning model, and/or imaging systems or subsystems described herein. The one or more computer systems, the one or more components, the GUI, the image processing module, and the machine learning model may be configured according to any of the embodiments described herein. In addition, the method described above may be performed by any of the system embodiments described herein.

Figure 8:
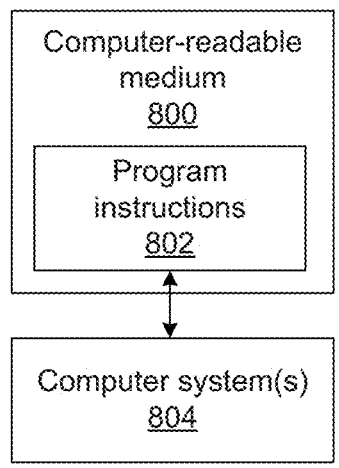
FIG. 8 is a block diagram illustrating one embodiment of a non-transitory computer-readable medium storing program instructions for causing one or more computer systems to perform a computer-implemented method described herein.

An additional embodiment relates to a non-transitory computer-readable medium storing program instructions executable on one or more computer systems for performing a computer-implemented method for training a machine learning method. One such embodiment is shown in FIG. 8. In particular, as shown in FIG. 8, non-transitory computer-readable medium 800 includes program instructions 802 executable on computer system(s) 804. The computer-implemented method may include any step(s) of any method(s) described herein.

Program instructions 802 implementing methods such as those described herein may be stored on computer-readable medium 800. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 804 may be configured according to any of the embodiments described herein.

Further modifications and alternative embodiments of various aspects of the invention will be apparent to those skilled in the art in view of this description. For example, methods and systems for training a machine learning model with one or more synthetic images are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to train a machine learning model, comprising:
one or more computer subsystems; and
one or more components executed by the one or more computer subsystems, wherein the one or more components comprise:
a graphical user interface (GUI) configured for:
displaying one or more images for a specimen and image editing tools to a user; and
receiving input from the user, wherein the input comprises one or more alterations to at least one of the one or more images using one or more of the image editing tools;
an image processing module configured for applying the one or more alterations to the at least one of the one or more images thereby generating at least one modified image and storing the at least one modified image in a training set, wherein the one or more images displayed in the GUI are images in an initial training set, wherein the initial training set comprises fewer than a predetermined number of instances of a known defect of interest for the specimen, wherein the one or more alterations comprise creating one or more synthetic defects in the at least one of the one or more images based on one or more characteristics of the known defect of interest thereby generating one or more of the at least one modified image, and wherein the storing comprises adding the one or more of the at least one modified image to the initial training set thereby generating the training set; and
a machine learning model configured for performing one or more functions for the specimen using images generated for the specimen by an imaging subsystem;
wherein the one or more computer subsystems are configured for training the machine learning model with the training set in which the at least one modified image is stored.

2. The system of claim 1, wherein the one or more alterations further comprise annotating the at least one of the one or more images with a defect class label.

3. The system of claim 1, wherein the one or more alterations further comprise one or more manually drawn alterations input by the user with a drawing tool included in the image editing tools.

4. The system of claim 1, wherein the one or more alterations further comprise pasting a portion of an image corresponding to the known defect of interest into at least another of the one or more images.

5. The system of claim 1, wherein the initial training set does not comprise any instances of the known defect of interest for the specimen.

6. The system of claim 1, wherein the one or more alterations further comprise one or more modifications to a portion of at least another of the one or more images corresponding to a defect, and wherein generating the at least one modified image comprises generating a new image based on the one or more modifications.

7. The system of claim 6, wherein the one or more modifications comprise scaling, rotating, edge blurring, or intensity modification.

8. The system of claim 1, wherein the GUI is further configured for displaying results of the training to the user.

9. The system of claim 1, wherein the GUI is further configured for displaying results of the one or more functions performed by the trained machine learning model for the specimen or another specimen using the images generated for the specimen or the other specimen, respectively, by the imaging subsystem.

10. The system of claim 9, wherein the GUI is further configured for receiving additional input from the user in response to displaying the results of the one or more functions performed by the trained machine learning model for the specimen or the other specimen.

11. The system of claim 10, wherein the additional input comprises a validity of the results of the one or more functions performed by the trained machine learning model for the specimen or the other specimen.

12. The system of claim 10, wherein the one or more functions comprise detecting defects on the specimen or the other specimen, wherein the additional input comprises a selection of one or more of the detected defects for the image processing module to store in the training set thereby generating a modified training set, and wherein the one or more computer subsystems are further configured for re-training the machine learning model with the modified training set.

13. The system of claim 1, wherein the one or more functions comprise detecting defects on the specimen.

14. The system of claim 1, wherein the one or more functions comprise classifying defects detected on the specimen.

15. The system of claim 1, wherein the imaging subsystem is configured as an electron beam based imaging subsystem.

16. The system of claim 1, wherein the imaging subsystem is configured as an optical based imaging subsystem.

17. The system of claim 1, wherein the specimen is a wafer.

18. The system of claim 1, wherein the specimen is a reticle.

19. A non-transitory computer-readable medium, storing program instructions executable on one or more computer systems for performing a computer-implemented method for training a machine learning model, wherein the computer-implemented method comprises:

displaying one or more images for a specimen and image editing tools to a user with a graphical user interface (GUI);

receiving input from the user via the GUI, wherein the input comprises one or more alterations to at least one of the one or more images using one or more of the image editing tools;

applying the one or more alterations to the at least one of the one or more images thereby generating at least one modified image;

storing the at least one modified image in a training set, wherein said applying and said storing are performed by an image processing module, wherein the one or more images displayed in the GUI are images in an initial training set, wherein the initial training set comprises fewer than a predetermined number of instances of a known defect of interest for the specimen, wherein the one or more alterations comprise creating one or more synthetic defects in the at least one of the one or more images based on one or more characteristics of the known defect of interest thereby generating one or more of the at least one modified image, and wherein the storing comprises adding the one or more of the at least one modified image to the initial training set thereby generating the training set; and training a machine learning model with the training set in which the at least one modified image is stored, wherein the machine learning model is configured for performing one or more functions for the specimen using images generated for the specimen by an imaging subsystem, wherein the GUI, the image processing module, and the machine learning model are included in one or more components executed by the one or more computer systems, and wherein the training is performed by the one or more computer systems.

20. A computer-implemented method for training a machine learning model, comprising:

displaying one or more images for a specimen and image editing tools to a user with a graphical user interface (GUI);

receiving input from the user via the GUI, wherein the input comprises one or more alterations to at least one of the one or more images using one or more of the image editing tools;

applying the one or more alterations to the at least one of the one or more images thereby generating at least one modified image;

storing the at least one modified image in a training set, wherein said applying and said storing are performed by an image processing module, wherein the one or more images displayed in the GUI are images in an initial training set, wherein the initial training set comprises fewer than a predetermined number of instances of a known defect of interest for the specimen, wherein the one or more alterations comprise creating one or more synthetic defects in the at least one of the one or more images based on one or more characteristics of the known defect of interest thereby generating one or more of the at least one modified image, and wherein the storing comprises adding the one or more of the at least one modified image to the initial training set thereby generating the training set; and training a machine learning model with the training set in which the at least one modified image is stored, wherein the machine learning model is configured for performing one or more functions for the specimen using images generated for the specimen by an imaging subsystem, wherein the GUI, the image processing module, and the machine learning model are included in one or more components executed by one or more computer subsystems, and wherein the training is performed by the one or more computer subsystems.

21. A system configured to train a machine learning model, comprising:

one or more computer subsystems; and one or more components executed by the one or more computer subsystems, wherein the one or more components comprise:

a graphical user interface (GUI) configured for:

displaying one or more images for a specimen and image editing tools to a user; and receiving input from the user, wherein the input comprises one or more alterations to at least one of the one or more images using one or more of the image editing tools, and wherein the one or more alterations comprise one or more manually drawn alterations input by the user with a drawing tool included in the image editing tools;

an image processing module configured for applying the one or more alterations to the at least one of the one or more images thereby generating at least one modified image and storing the at least one modified image in a training set; and a machine learning model configured for performing one or more functions for the specimen using images generated for the specimen by an imaging subsystem;

wherein the one or more computer subsystems are configured for training the machine learning model with the training set in which the at least one modified image is stored.

22. A system configured to train a machine learning model, comprising:

one or more computer subsystems; and one or more components executed by the one or more computer subsystems, wherein the one or more components comprise:

a graphical user interface (GUI) configured for:

displaying one or more images for a specimen and image editing tools to a user; and receiving input from the user, wherein the input comprises one or more alterations to at least one of the one or more images using one or more of the image editing tools;

an image processing module configured for applying the one or more alterations to the at least one of the one or more images thereby generating at least one modified image and storing the at least one modified image in a training set, wherein the one or more images displayed in the GUI are images in an initial training set, wherein the initial training set does not comprise any instances of a known defect of interest for the specimen, wherein the one or more alterations comprise creating a synthetic defect in the at least one of the one or more images based on one or more characteristics of the known defect of interest, and wherein the storing comprises adding the at least one modified image to the initial training set thereby generating the training set; and a machine learning model configured for performing one or more functions for the specimen using images generated for the specimen by an imaging subsystem;

wherein the one or more computer subsystems are configured for training the machine learning model with the training set in which the at least one modified image is stored.

* * * * *